United States Patent
Komori et al.

(10) Patent No.: US 6,936,371 B2
(45) Date of Patent: Aug. 30, 2005

(54) METHOD FOR RECYCLING BATTERY PACK

(75) Inventors: Katsunori Komori, Toyohashi (JP); Noriyuki Fujioka, Kosai (JP); Tadao Kimura, Kobe (JP); Haruyoshi Yamashita, Toyota (JP); Yasuhiro Takahashi, Toyota (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 275 days.

(21) Appl. No.: 10/188,454

(22) Filed: Jul. 2, 2002

(65) Prior Publication Data

US 2003/0008201 A1 Jan. 9, 2003

(30) Foreign Application Priority Data

Jul. 4, 2001 (JP) .................................... 2001-203615

(51) Int. Cl.$^7$ ................... H01M 10/42; H01M 10/48; H01M 10/54
(52) U.S. Cl. ................... 429/49; 29/623.1; 429/74; 429/91
(58) Field of Search ................. 429/49, 72, 206, 429/82, 74, 91

(56) References Cited

U.S. PATENT DOCUMENTS

| 5,308,713 A | * | 5/1994 | Mayer et al. ............. 429/49 |
| 5,580,675 A | * | 12/1996 | Rouhani ............... 429/90 |
| 5,981,100 A | * | 11/1999 | Rouhani ............... 429/90 |

FOREIGN PATENT DOCUMENTS

| JP | 2000-215882 | 8/2000 | |
| JP | 2000215882 A | * 8/2000 | ............ H01M/2/36 |

* cited by examiner

Primary Examiner—Tracy Dove
(74) Attorney, Agent, or Firm—Hamre, Schumann, Mueller & Larson, P.C.

(57) ABSTRACT

A method for recycling a battery pack is provided that enables a degraded battery pack to be replaced at a low cost while maintaining the advantages of a conventional sealed-type nickel-metal hydride secondary battery as being free from maintenance or leak of an electrolyte. The battery pack accommodates a battery module having a plurality of cells, which are a sealed-type nickel-metal hydride secondary battery, combined with each other. When the battery pack is judged as being degraded in a market, the battery pack is collected from the market as a battery to be replaced; a cell or battery module judged as being degraded is renewed by adding an electrolyte thereto; the battery module is installed in the battery pack again; and the battery pack is supplied as a replacement battery.

9 Claims, 8 Drawing Sheets

|  | After 50 cycles | After 4000 cycles | After electrolytic solution replenishment |
|---|---|---|---|
| Internal resistance (m$\Omega$) | 13.2 | 16.8 | 13.8 |
| Amount of self discharge (%) | 15 | 24 | 16 |

FIG.8

METHOD FOR RECYCLING BATTERY PACK

BACKGROUND OF THE INVENTION

1. Field of the Invention

The present invention relates to a method for recycling a battery pack accommodating a sealed-type nickel-metal hydride secondary battery by collecting the battery pack from the market when it is judged as being degraded and renewing it.

2. Description of the Related Art

A nickel-metal hydride secondary battery of the "liquid-starved type", which is an example of a sealed type alkaline secondary battery, has the advantages of being maintenance free and having a long charge/discharge cycle life. According to these advantages, there has been a high demand for the liquid-starved type nickel-metal hydride secondary battery in the market for pure electric vehicles (PEVs), hybrid electric vehicles (HEVs), etc., which need a secondary battery having an extremely long lifetime.

However, the lifetime of the liquid-starved type nickel-metal hydride secondary battery is over when an electrolyte inside the battery decreases to bring about a condition of liquid exhaustion, thereby increasing an internal resistance of the battery. When the battery is used in a vehicle such as a PEV or HEV, this may lead to the following problems. If the lifetime of the battery is shorter than that of the vehicle, the lifetime of the vehicle is limited by the lifetime of the battery. In addition, the cost required for replacing the battery pack with a new one is high.

On this account, for the purpose of extending the lifetime of the battery, JP 2000-215882 A, for example, discloses a method in which a screw-type inlet that can be opened and closed is provided in a battery case, and when the internal resistance of the battery becomes greater than 1.5 times the initial internal resistance, an electrolyte is added via this inlet until the internal resistance becomes not more than 1.5 times the initial internal resistance.

However, if the inlet that can be opened and closed is provided in the battery case, there is a possibility that an alkaline electrolyte having upward wicking characteristics along the inner wall of the battery case leaks from the inlet, and it is difficult to prevent such leak from occurring. Moreover, since the electrolyte needs to be added via the inlet by the user himself, the advantage of the sealed type alkaline secondary battery as being maintenance free cannot be taken.

SUMMARY OF THE INVENTION

The present invention has been made in light of the above-mentioned problems in the prior art. It is an object of the present invention to provide a method for recycling a battery pack, which enables a degraded battery pack to be replaced at a low cost while maintaining the advantages of a conventional nickel-metal hydride secondary battery of completely-sealed type as being free from maintenance or leak of an electrolyte.

In order to achieve the above-mentioned object, a method for recycling a battery pack according to the present invention is a method for recycling a battery pack accommodating a battery module in which a plurality of cells are combined with each other, each of the cells being a sealed-type nickel-metal hydride secondary battery, including: collecting a battery pack from a market as a battery to be replaced when the battery pack is judged as being degraded; renewing a cell or battery module judged as being degraded by adding an electrolyte thereto; installing the battery module in the battery pack again; and supplying the battery pack as a replacement battery.

In this method for recycling a battery pack, it is preferable that an internal resistance of the cells or the battery module of the battery pack is monitored during use, and the battery to be replaced is a battery pack judged as being degraded based on a fact that the internal resistance of the cells or the battery module has increased to a predetermined value.

Further, the battery pack is mounted on a vehicle provided with a motor as a driving power source and an electric generator, and both a positive electrode terminal and a negative electrode terminal are connected to the vehicle.

Furthermore, it is preferable that the battery to be replaced is a battery pack judged as being degraded based on a fact that a deviation in remaining capacity or voltage in the battery pack has reached a predetermined value during use.

Still further, it is preferable that the cells or the battery module is a sealed battery of liquid-starved type.

Still further, it is preferable that the cells or the battery module is provided with a safety vent, or alternatively, a case accommodating each of the cells or the battery module is made of a resin material. In this case, it is preferable that an amount of the electrolyte to be added is determined based on a decrease in weight of the cells or the battery module calculated by comparing a weight of the cells or the battery module when collected with that of the cells or the battery module when manufactured. The reason for this is that, in a battery employing a safety vent or a resin case, the amount of the electrolyte to be added can be determined easily since a liquid is discharged from the battery through the safety vent opened in the last stage of its lifetime or through the resin.

Still further, it is preferable that an inlet is opened on the resin case accommodating the cell or battery module judged as being degraded, an electrolyte is added to the cell or battery module judged as being degraded via the inlet, and a resin is then welded onto the inlet. The reason for this is that, in a battery employing a resin case, a new inlet can be formed easily, and the cell replenished with the electrolyte can be sealed completely with the resin.

Further, in the method for recycling a battery pack according to the present invention, it is preferable that, before or after adding the electrolyte to the cell or battery module judged as being degraded, an interior of the cell or battery module judged as being degraded is evacuated or depressurized. The reason for this is that, by doing so, the electrolyte can permeate sufficiently and deeply into separators, which are degraded and suffering from serious liquid exhaustion.

In accordance with the present invention as described above, while maintaining the advantages of a conventional nickel-metal hydride secondary battery of the completely-sealed type as being free from maintenance or leak of an electrolyte, a degraded battery pack can be inexpensively replaced with a battery pack obtained by renewing a degraded battery pack collected, and the battery pack thus renewed can be reused in PEVs, HEVs, etc.

These and other advantages of the present invention will become apparent to those skilled in the art upon reading and understanding the following detailed description with reference to the accompanying figures.

DETAILED DESCRIPTION OF THE INVENTION

Hereinafter, a preferable embodiment of the present invention will be described with reference to the accompanying drawings.

First, a configuration of battery modules to be arranged in parallel and installed in a battery pack to which a recycling method according to one embodiment of the present invention is applied will be described with reference to FIGS. 1A, 1B, 2, 3, 4, 5, and 6.

A battery module 1 used in the present embodiment is a nickel-metal hydride secondary battery, which can be used suitably as a driving power source for PEVs and HEVs. As shown in FIGS. 1A, 1B, 2, and 3, the battery module 1 is made up of a plurality of (six in the drawings) rectangular cell cases 3, each having short side faces of small width, long side faces of large width, and an open top face. The cell cases 3 are connected with each other integrally sharing their short side faces, thereby forming an integral case 2, and the open top faces of the respective cell cases 3 are closed altogether by an integral lid 4.

Each of the cell cases 3 accommodates an electrode plate group 5 together with an alkaline electrolyte, thereby constituting a cell 6. The electrode plate group 5 includes a number of positive electrode plates and negative electrode plates, which are arranged in parallel to the long side faces of the cell cases 3 and laminated in the direction of the short side faces of the cell cases 3 with separators intervening therebetween. The configuration of the electrode plate group 5 will be described later in more detail.

Connection holes 7 are formed at the upper end portions of the outer short side faces of the cell cases 3 at both ends of the integral case 2 and at the upper end portion of the common short side face between neighboring cell cases 3, 3. To the connection holes 7 at the outer short side faces of the cell cases 3 at both the ends, a positive or negative connection terminal 8 is connected. On the other hand, to the connection holes 7 in the common short side face between the neighboring cell cases 3, 3 in the middle, connection fittings 9 for connecting the cells 6, 6 on both sides in series are attached.

On the top face of the lid 4, through holes 35 are formed in adjacent edge portions of neighboring cell cases 3, 3. Further, communicating lids 36, each having a communicating path 37 for connecting these through holes 35, 35, are welded onto the lid 4. The reference numeral 36a denotes a reinforcing protrusion provided so as to protrude from the central portion of the inner face of each communicating lid 36. The reinforcing protrusion 36a is sized so that it does not close the communicating path 37, and its tip is in contact with the top face of the lid 4 and welded thereto, thereby ensuring the pressure resistance of each communicating lid 36. The integral case 2, the lid 4, and the communicating lids 36 are made of a synthetic resin material such as a PP/PPE alloy and are repellent to an electrolyte.

Further, on the top face of the lid 4, a safety vent 10 is provided that releases pressure when the internal pressure in the respective cell cases 3 has exceeded a certain value. In addition, a sensor mounting hole 11 for accommodating a temperature sensor for detecting the temperature of the cells 6 is formed in such a manner that it is recessed below the top face of the lid 4 to be in contact with the upper end of the electrode plate group 5 in a suitable cell 6.

On each long side face of the integral case 2, which is formed by the long side faces of the cell cases 3, protruding ribs 13 that extend vertically are provided at positions corresponding to both side edges of the respective cell cases 3. Further, a number of relatively small circular projections 14 are formed in a matrix at a suitable pitch between the ribs 13, 13. The ribs 13 and the projections 14 may have the same height. Furthermore, coupling ribs 15a and 15b having the same height as the ribs 13 and the projections 14 are formed on the upper end portions of the cell cases 3 and the side faces of the lid 4. On the upper and lower portions of the outer face of the two ribs 13 in the vicinity of both ends of the long side faces of the integral case 2, a plurality of projections 16 and recesses 17 used for positioning are provided. These projections 16 and recesses 17 fit with each other when a plurality of integral cases 2 are laminated with each other on their long side surfaces. When a plurality of integral cases 2 are arranged in parallel, coolant passages for efficiently and uniformly cooling the respective cell cases 3 are formed between the ribs 13, the projections 14, and the coupling ribs 15a, 15b.

Figure 1A:
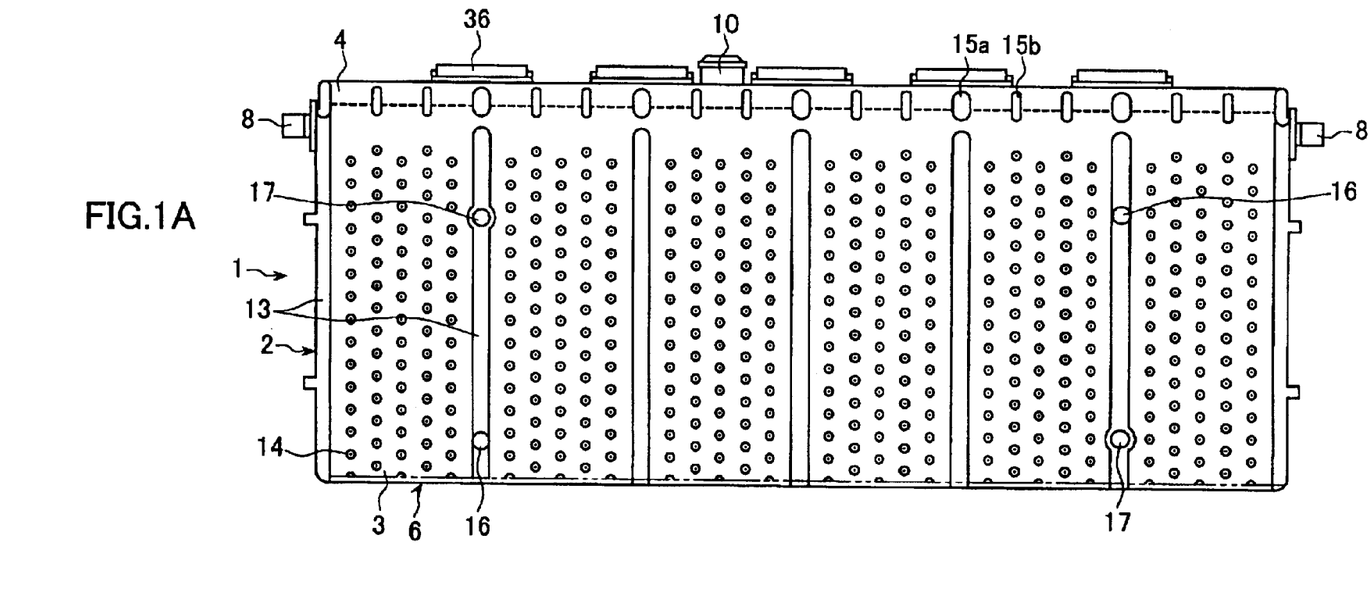
FIG. 1A is a front view showing a configuration of a battery module to which a method for recycling a battery pack according to one embodiment of the present invention is applied.
Figure 1B:
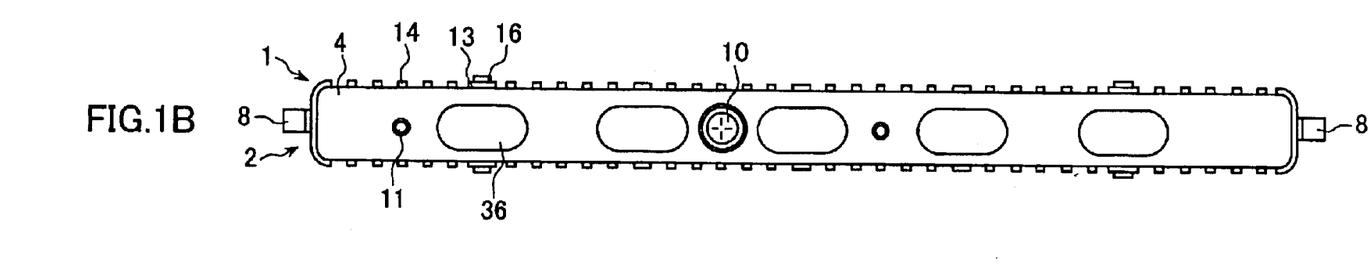
FIG. 1B is a plan view showing a configuration of a battery module to which a method for recycling a battery pack according to one embodiment of the present invention is applied.
Figure 2:
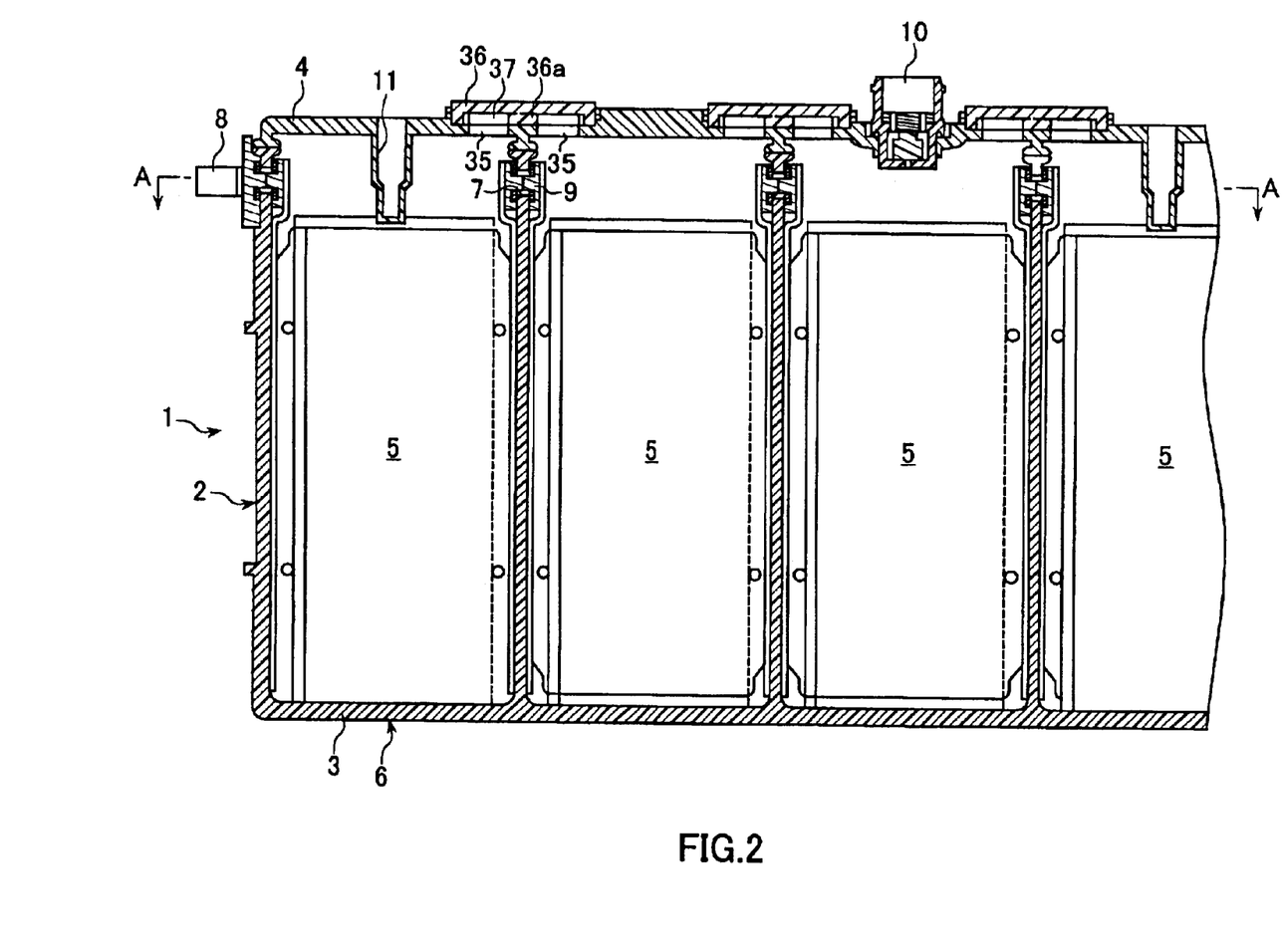
FIG. 2 is a partial, longitudinal cross-sectional side view of the battery module shown in FIGS. 1A and 1B.
Figure 3:
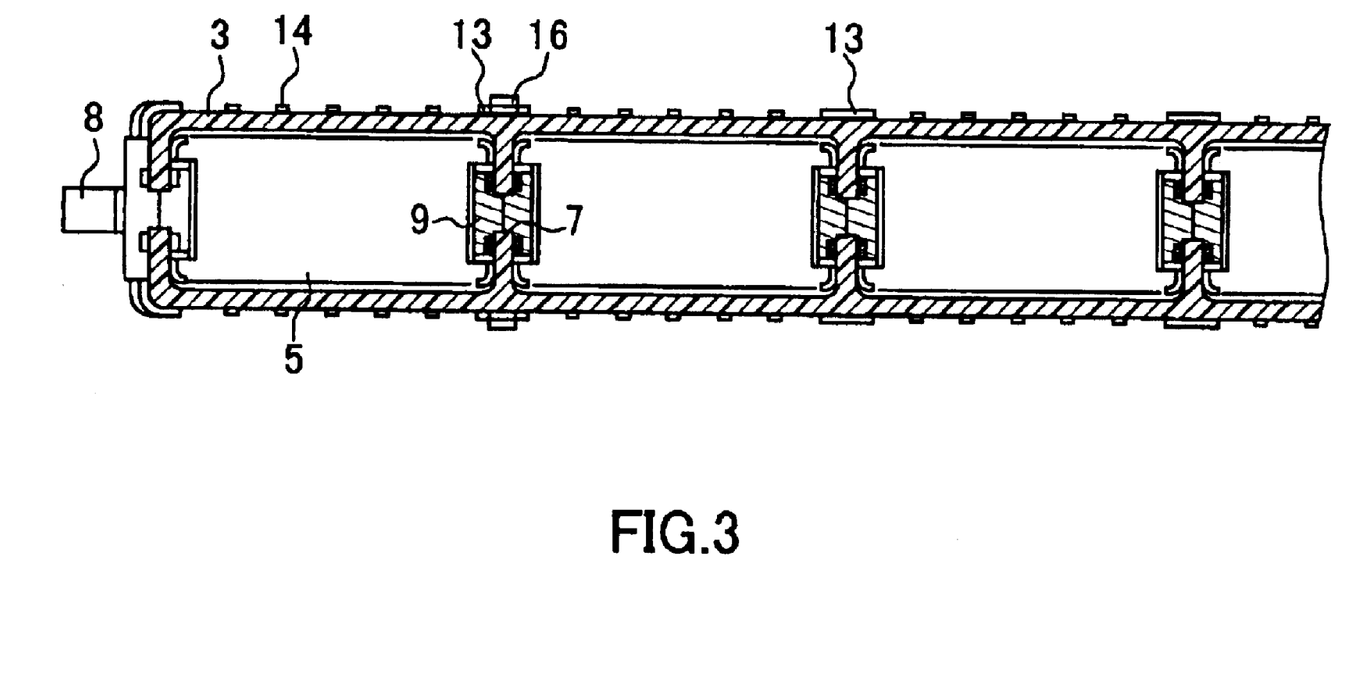
FIG. 3 is a cross-sectional view taken along the line A—A in FIG. 2 viewed from the arrow direction.
Figure 4:
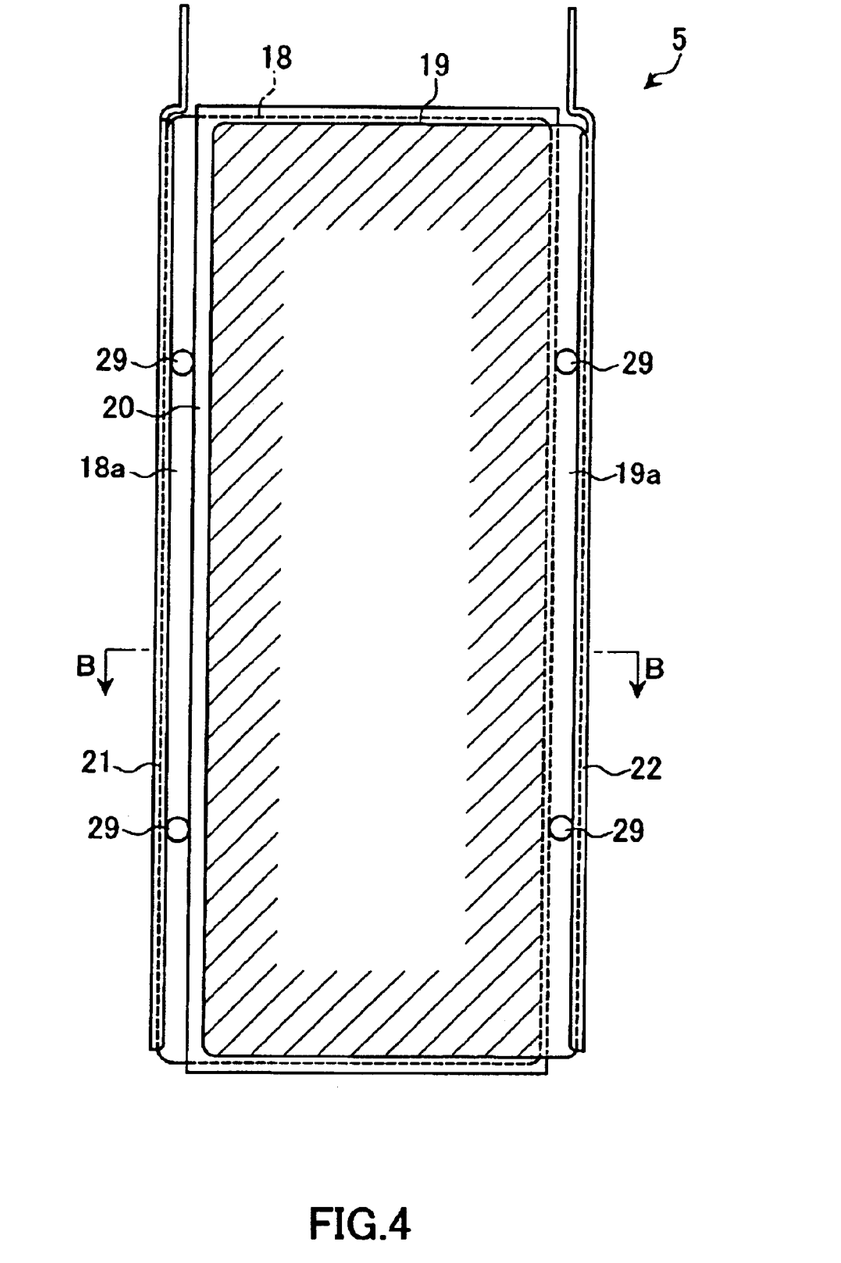
FIG. 4 is a front view of an electrode plate group 5 shown in FIG. 2.
Figure 5:
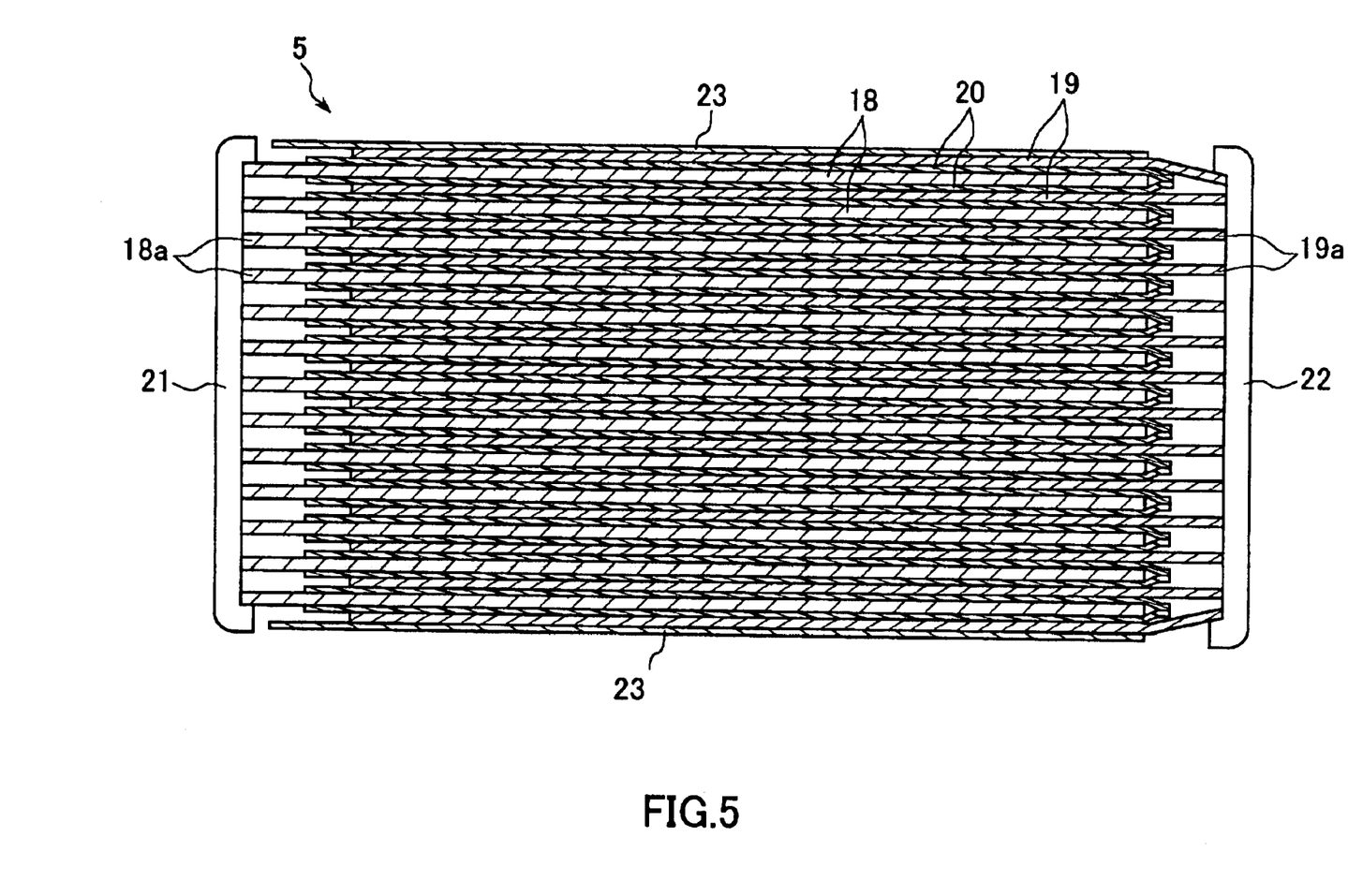
FIG. 5 is a cross-sectional view taken along the line B—B in FIG. 4 viewed from the arrow direction.

In the following, the above-mentioned electrode plate group 5 will be described with reference to FIGS. 4 and 5. The electrode plate group 5 includes a large number of positive electrode plates 18 made of Ni foamed metal and a large number of negative electrode plates 19 made of Ni perforated metal coated with an active material. The positive electrode plates 18 and the negative electrode plates 19 are laminated alternately, and the positive electrode plates 18 are covered with separators 20 having an opening on one side in the lateral direction so that the separators 20 intervene between the positive electrode plates 18 and the negative electrode plates 19. In FIG. 4, the hatched area represents a region where the positive electrode plates 18 and the negative electrode plates 19 oppose each other via the separators 20 to generate electricity. The side end portions of the group of positive electrode plates 18 protrude beyond the group of negative electrode plates 19 on one side, and the side end portions of the group of negative electrode plates 19 protrude beyond the group of positive electrode plates 18 on the opposite side. These protruding side end portions serve as leads 18a, 19a. Collector plates 21, 22 are welded onto the protruding side end portions of the positive electrode plates 18 and the negative electrode plates 19, respectively. Both side ends of the collector plates 21, 22 are bent inwardly to prevent the electrode plate group 5 from expanding outwardly due to the pressure generated when the collector plates 21, 22 are welded onto the electrode plates 18, 19, thus regulating the size of the electrode plate group 5. The reference numeral 23 denotes peripheral separators provided on the outer faces of the electrode plate group 5 between the collector plates 21, 22.

The reference numeral 29 denotes a pair of positioning holes formed in the leads 18a, 19a, with suitable spaces being provided above and below thereof. By pressing the side edges of the leads 18a, 19a with positioning pins being inserted in the positioning holes 29, the side edges of the leads 18a, 19a can be neatly aligned so that the collector plates 21, 22 are welded onto the side edges of the leads 18a, 19a securely and evenly.

Figure 6:
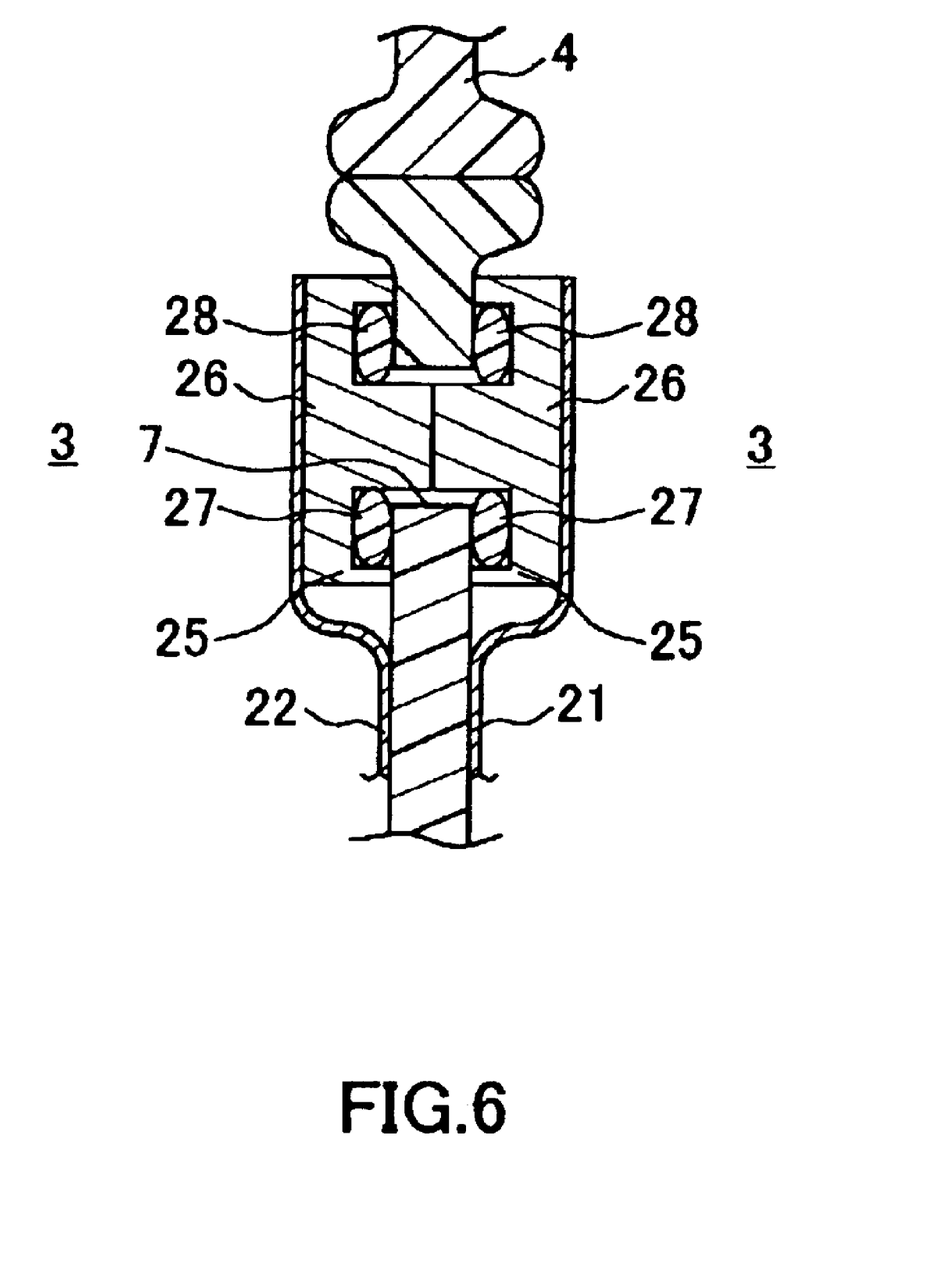
FIG. 6 is a longitudinal cross-sectional view showing a detailed configuration of a connection fitting 9 shown in FIG. 2.

Further, as shown in FIG. 6, the connection fittings 9 for connecting neighboring cells 6, 6 in series includes a pair of symmetrical fittings 25 with a shaft, whose base end faces are welded onto the upper end portion of the collector plate 21 of one cell 6 and the upper end portion of the collector plate 22 of the other cell 6, respectively. Protruding shaft portions 26 provided at the shaft core portions of the symmetrical fittings 25 are inserted into the connection hole 7 from both sides, respectively, so that their leading end faces are in contact with each other. The leading end faces of the symmetrical fittings 25 are connected with each other by welding, thereby connecting the neighboring cells 6. It is to be noted here that the upper end portions of the collector plates 21, 22 and the base end faces of the symmetrical fittings 25, and the leading end faces of the respective protruding shaft portions 26 are welded by resistance welding at one time after setting them in position. Further, an annular groove 27 is provided around each of the protruding shaft portions 26 of the symmetrical fittings 25, and an O-ring 28 is further attached to the annular groove 27. The connection hole 7 is thus double-sealed.

A plurality of battery modules having the above-mentioned configuration are arranged in parallel and installed in a battery pack. Prior to delivery of the thus-assembled battery pack, an initial weight of the battery modules is measured so that an amount that the electrolyte decreased during the use in the market can be calculated based on this initial weight, and the battery pack is subjected to an activation process, inspection process, etc. After delivery, the battery pack is mounted on a vehicle such as a HEV and is charged and discharged repeatedly depending on its usage.

In order to monitor the battery condition affected by charge/discharge of the battery pack, the battery pack measures the voltage, current, temperature of the battery installed therein; calculates the remaining capacity and internal resistance of the battery based on the measurements; and transmits the information about the battery to a control section of the vehicle. In the case where the internal resistance calculated with respect to each cell or battery module has exceeded a predetermined value, or in the case where deviations in remaining capacity and voltage among the cells or among the battery modules have exceeded a predetermined value, the battery pack judges itself as being degraded and in the last stage of its lifetime, and transmits an alarm signal to the control section of the vehicle.

In the following, a method for recycling a battery pack by collecting a battery pack judged as being degraded from a market, renewing it, and then reusing it as a replacement battery will be described with reference to FIG. 7.

Figure 7:
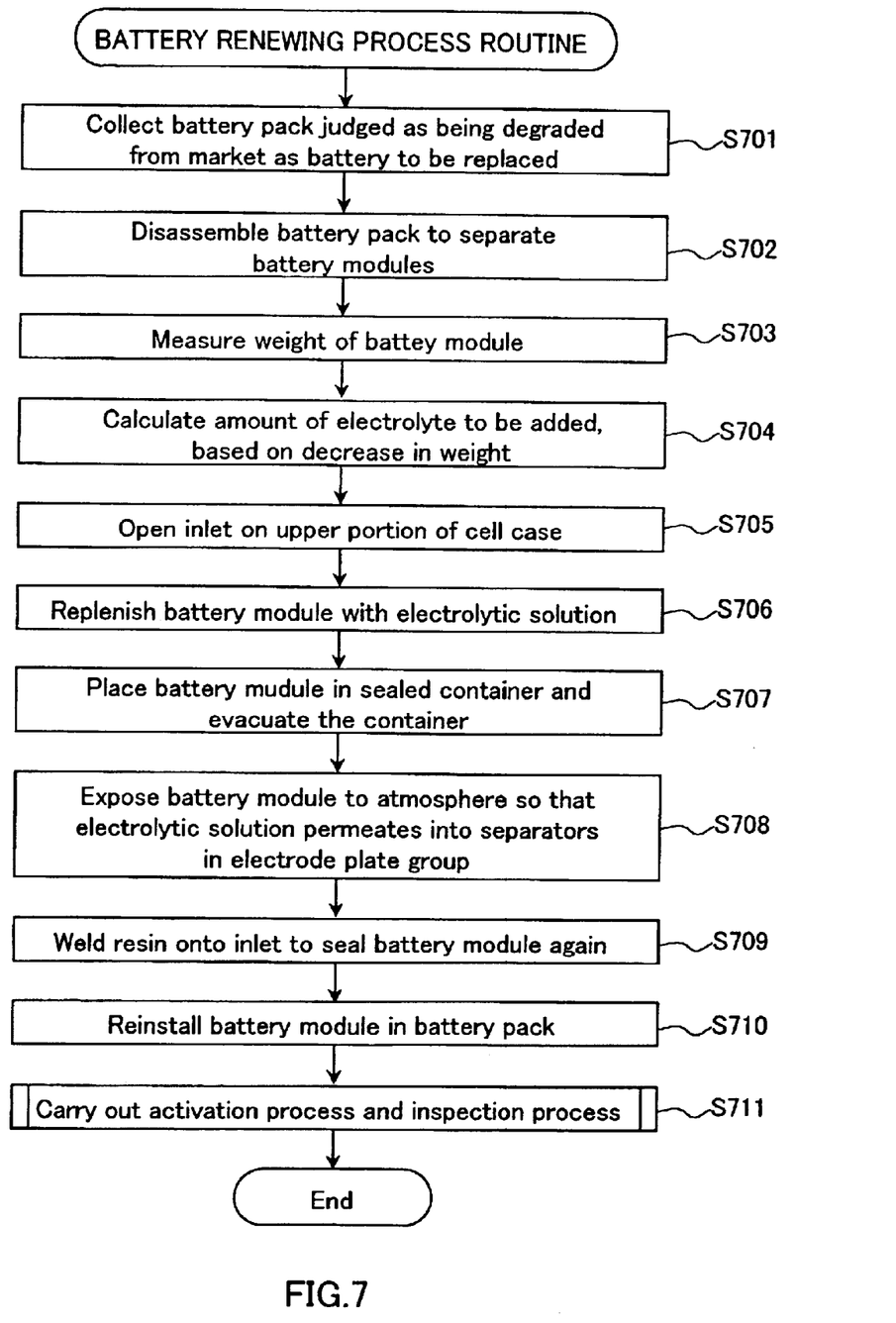
FIG. 7 is a flow chart showing a battery renewing process routine in a method for recycling a battery pack according to one embodiment of the present invention.

FIG. 7 is a flow chart showing a battery renewing process routine in a method for recycling a battery pack according to one embodiment of the present invention. In FIG. 7, first, a battery pack judged as being degraded is collected from the market as a battery to be replaced (S701). Next, the battery pack thus collected is disassembled to separate individual battery modules 1 (S702), and the weight of a battery module 1 judged as being degraded is measured (S703). Based on the initial weight of the battery module 1 measured in the manufacturing process thereof, a decrease in weight of the battery module 1 is calculated, and based on this calculation result, the amount of electrolyte to be added is calculated (S704).

The following is a simulation of charge/discharge cycles performed in the market. For example, when a battery module 1 having a remaining capacity from 20% to 80% was charged and discharged by repeating a charge/discharge cycle consisting of 2C charging and 2C discharging 4000 times at a temperature of 35° C., the weight of the battery module 1 decreased by 9 g. It is considered that the weight of the battery module 1 decreased because liquid passed through the resin cell cases 3 and the safety vent was opened due to an increase in the internal pressure.

Next, inlets are opened by melting the resin on the upper portions of the cell cases 3 accommodating the respective cells 6 in the battery module 1 judged as being degraded (S705). The electrolyte corresponding to the amount calculated in the above-mentioned step S704 is divided evenly for the respective cells 6 and added thereto through the respective inlets (S706). The battery module 1 thus replenished with the electrolyte is placed in a sealed container, and the container is evacuated or depressurized (S707). Thereafter, the battery module 1 is taken out from the sealed container and exposed to the atmosphere so that the added electrolyte permeates deeply into the separators 20 in the electrode plate group 5 (S708).

Subsequently, a resin plate is welded onto the inlet opened on the upper portion of the resin cell case 3, thus sealing the battery module 1 again (S709), and the battery modules are installed in the battery pack again (S710). An activation process and an inspection process are carried out (S711), thus completing the renewing process of the battery pack. The battery pack thus renewed is delivered as a replacement battery, and again is mounted on a vehicle such as HEVs.

Figure 8:
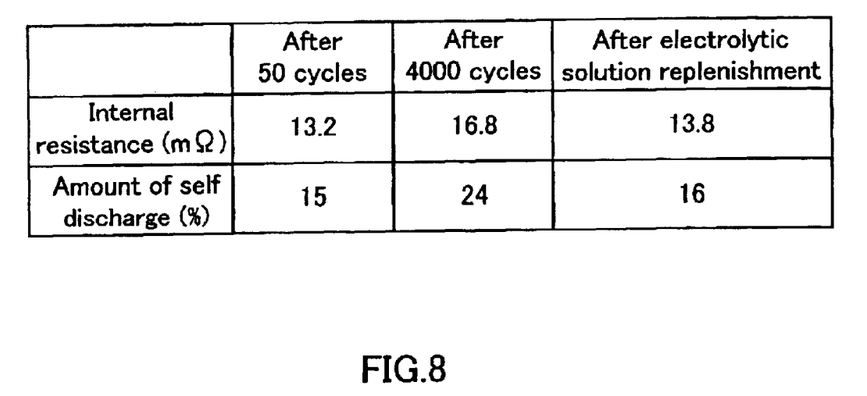
FIG. 8 is a table showing an internal resistance and an amount of self discharge of a battery module at an initial stage of charge/discharge cycles (after 50 cycles), at the last stage of its lifetime (after 4000 cycles), and after being replenished with an electrolyte.

In FIG. 8, the internal resistances and amounts of self discharge of a battery module 1 (including six cells 6) at an initial stage of charge/discharge cycles (after 50 cycles), at the last stage of its lifetime (after 4000 cycles), and after being replenished with an electrolyte are compared. The internal pressures were measured by applying a charge/discharge pulse (25 A, 50 A, 75A) to the battery module 1 at 60% SOC for 5 seconds, and the amounts of self discharge were determined by measuring a remaining capacity of the battery module 1 after the battery module 1 at 60% SOC had been left for 1 week at a temperature of 45° C. From FIG. 8, it is understood that the battery module 1 is renewed after being replenished with the electrolyte since the internal resistance and amount of self discharge of the battery module 1 after replenishment are almost compatible to those in the initial state.

The above-mentioned embodiment describes a battery pack in which a plurality of battery modules, each including an integral case accommodating six cells, are arranged in parallel. However, it is to be noted that a similar method for recycling battery can be used in a battery pack in which the respective cells are arranged in parallel.

As specifically described above, the present invention can produce a remarkable effect of enabling a degraded battery pack to be inexpensively replaced with a battery pack obtained by renewing a degraded battery pack collected and reusing the battery pack thus renewed in PEVs, HEVs, etc., while maintaining the advantages of a conventional nickel-metal hydride secondary battery of the completely-sealed type as being free from maintenance or leak of an electrolyte.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method of recycling a battery pack accommodating a battery module in which a plurality of cells are combined with each other, each of the cells being a sealed nickel-metal hydride secondary cell, comprising:

collecting the battery pack from a market when the battery pack is judged as being degraded;

renewing the cells or battery module judged as being degraded by adding an electrolyte thereto;

wherein an amount of the electrolyte to be added is determined based on a decrease in weight of the cells or the battery module calculated by comparing a weight of the cells or the battery module when collected with that of the cells or the battery module when manufactured;

installing the battery module in the battery pack again; and supplying the battery pack as a replacement battery.

2. The method for recycling a battery pack according to claim 1, wherein an internal resistance of the cells or the battery module of the battery pack is monitored during use, and the battery pack is judged as being degraded based on a fact that the internal resistance of the cells or the battery module has increased to a predetermined value.

3. The method for recycling a battery pack according to claim 1, wherein the battery pack is mounted on a vehicle with a motor as a driving power source and an electric generator, and both a positive electrode terminal and a negative electrode terminal are connected to the vehicle.

4. The method for recycling a battery pack according to claim 1, wherein the battery pack is judged as being degraded based on a fact that a deviation in remaining capacity or voltage in the battery pack has reached a predetermined value during use.

5. The method for recycling a battery pack according to claim 1, wherein the cells or the battery module is a sealed battery of liquid-starved type.

6. The method for recycling a battery pack according to claim 1, wherein the cells or the battery module is provided with a safety vent.

7. The method for recycling a battery pack according to claim 1, wherein a case accommodating each of the cells or the battery module is made of a resin material.

8. The method for recycling a battery pack according to claim 7, wherein an inlet is opened on the resin case accommodating the cell or battery module judged as being degraded, an electrolyte is added to the cell or battery module judged as being degraded via the inlet, and a resin is then welded onto the inlet.

9. The method for recycling a battery pack according to claim 1, wherein, before or after adding the electrolyte to the cell or battery module judged as being degraded, an interior of the cell or battery module judged as being degraded is depressurized.

* * * * *